United States Patent [19]

Hudimac

[11] Patent Number: 4,816,725
[45] Date of Patent: Mar. 28, 1989

[54] METHOD AND APPARATUS FOR SUPPRESSING VIBRATION

[76] Inventor: Albert A. Hudimac, 12100 Devilwood Dr., Rockville, Md. 20854

[21] Appl. No.: 793,058

[22] Filed: Oct. 30, 1985

Related U.S. Application Data

[63] Continuation of Ser. No. 367,826, Apr. 12, 1982, abandoned.

[51] Int. Cl.[4] ............................................. G01D 15/00
[52] U.S. Cl. ....................................... 318/114; 318/127
[58] Field of Search ................................. 318/129–134, 318/114, 808; 381/71; 310/15, 43, 511

[56] References Cited

U.S. PATENT DOCUMENTS 3,088,062  4/1963  Hudimac ............................... 318/128

Primary Examiner—Arthur G. Evans
Attorney, Agent, or Firm—James Creighton Wray

[57] ABSTRACT

The electrical termination impedance of a variable reluctance electro-mechanical transducer is changed automatically in response to the frequency of vibration applied to the transducer to provide the optimum electrical termination impedance which produces the highest effective mechanical impedance at said frequency. The transducer includes magnetic cores interconnected by a spring formed by cutting a relatively thin medial annulus in a relatively thick flat disk. A digital logic circuit uses a signal counter and NAND gates to determine the frequency and close the appropriate fast-acting relay in a parallel array of capacitor-relays. A negative-impedance electrical termination provides a high mechanical impedance over a broad band of frequencies. A shunting circuit eliminates spurious resonances by providing substantially no shunting in the transducer terminating circuit at resonant frequency and substantial shunting in the terminating circuit at other frequencies.

37 Claims, 19 Drawing Sheets

FIG. 10 CONT.

| ID | NAME | RKG | V_CC | GND | NO | N.C. |
|----|------|-----|------|-----|------|------|
| A | PROG. COUNTER | 16 | 15 | 9 | XR 2240 | 1,2,8,10 |
| B | NAND GATE | 14 | 14 | 7 | CD 4012 | 6,8 |
| C | SCHMITT HEX INV | 14 | 14 | 7 | 74LS14 | |
| D | QUAD NOR GATE | 14 | 14 | 7 | 74LS 02 | 2,3,5,6 |
| E | PROG COUNTER | 16 | 15 | 9 | XR 2240 | 1,2,8,10 |
| F | DUAL MONO MVB | 16 | 14 | 8 | 74LS123 | |
| G | LATCH | 14 | 5 | 12 | 74LS75 | 7 |
| H | DECODER | 16 | 16 | 8 | 74LS42 | |
| J | HEX INV | 16 | 1 | 8 | CD4049 | 13,16 |
| I | " | " | " | " | " | " |
| K | QUAD DRIVER | 14 | 11 | 4 | 75492 | |
| L | " | " | " | " | " | 2,9 |
| N | 16 PIN SOCKET | | | | | |
| O | OP AMP | 8 | 7 | 4 V | CA3130 | 5 |
| OO | " | " | " | " | " | " |
| P | POWER CONV | 8 | | | 7660 | |

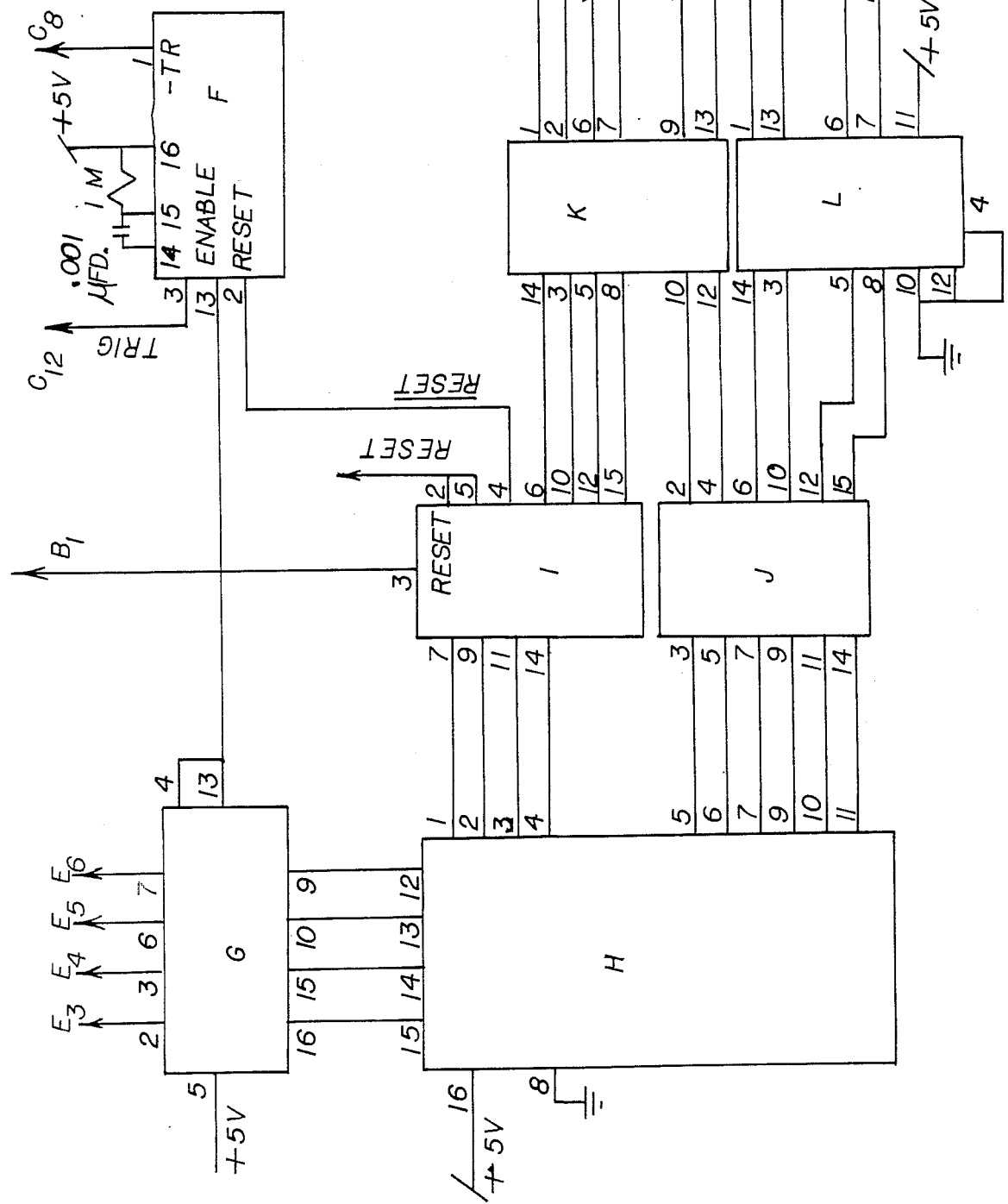

METHOD AND APPARATUS FOR SUPPRESSING VIBRATION

This application is a continuation of application Ser. No. 367,826 filed 4-12-82.

BACKGROUND OF THE INVENTION

This invention relates generally to vibration suppression and more particularly has reference to the control of electromechanical vibration suppressors to provide the proper electrical termination automatically in the case of a vibratory force having as a component a quasi-line in the spectrum which changes frequency slowly with time, to provide a termination that is optimum at the frequency of suppression and yet prevents or strongly moderates spurious resonances, and to provide optimum electrical termination over a moderately broad range of frequencies by a relatively simple negative impedance circuit.

This invention is an improvement on my previous invention disclosed in U.S. Pat. No. 3,088,062, for Electromechanical Vibratory Force Suppressor and Indicator, the disclosure of which is incorporated herein by reference. The specification for that patent describes a mechanical circuit (usually a spring s and a mass m in parallel) and a transducer with a particular external electrical termination $Z_e$. The electrical termination may be at a remote point. The transducer transforms the total electrical impedance composed of the blocked impedance $Z_T$ of the transducer in series with the external electrical impedance $Z_e$ into a virtual mechanical element whose impedance is $Z_u$. This is shown in FIG. 1 (a copy of FIG. 1b of the patent) in an equivalent electrical circuit where F is the open circuit force of the noise source, $Z_i$ is the internal impedance of the noise source, $Z_b$ is the impedance of the base on which the noise source rests and G is the electromechanical coupling constant. The theoretical basis of FIG. 1 is demonstrated in the Analysis portion of the Patent, Cols. 4, 5, 6, 7, and was verified with the experimental set-up shown in FIG. 2 (Patent FIG. 1a) in which the vibration suppressor was mounted on a thin plate, supported on pillow blocks and which was driven by a ballistically suspended shaker unit. The pillow blocks were mounted on a heavy horizontal baseplate. The results are given in FIG. 3 (similar to Patent FIG. 18) in which the experimentally determined optimum external capacitances (o) at discrete frequencies are compared with the theoretical curve (———). In an experiment using the set-up of FIG. 2, the relative velocity of suppression was determined as a function of frequency, the external terminating capacitance at each frequency being given by FIG. 3. The results are plotted in FIG. 4 (similar to Patent FIG. 17). If, on the other hand, a fixed external termination capacitor is used regardless of frequency, a greatly reduced velocity may be achieved at the frequency for which the given capacitor is the optimum termination, but, as the frequency moves either up or down, the velocity increases and may become larger than for the velocity without a suppressor (or dynamic absorber). Results are plotted in FIG. 5 (Patent FIG. 16). The case without suppression is plotted (———) and the case with suppression is plotted (----).

The kind of results obtained in FIG. 4 on a frequency by frequency basis can be obtained simultaneously over as wide a band of frequency as that over which the correct electrical termination can be achieved. FIG. 6 (corresponding to Patent FIG. 13) gives a positive feedback circuit of the "series" type for obtaining broadband electrical termination. The impedance in the grid circuit can be given by $Z_3$. Then the input impedance, which is to be used as the electrical impedance termination for the transducer $Z_e$ is given by $$Z_e = Z_3(1-A) + R_o)$$

where A is the gain of the two stage amplifier (with negative feedback for stability), and $R_o$ its output impedance. The condition for the external electrical impedance for the parallel circuit in FIG. 1 to be resonant and thus make $v_b$ small is $$Z_e = \frac{-G}{z_a - j\frac{(s+s')}{\omega}} - Z_T$$

Then equating the right-hand sides of the last two equations gives the $Z_3$ in FIG. 5 provided $$Z_T = j\omega L_T + R_T, L = \frac{G}{(A-1)(s+s')}, C = \frac{m(A-1)}{G}$$

SUMMARY OF THE INVENTION

The present invention is an improvement to the vibration suppressor disclosed in my earlier U.S. patent.

The present invention provides a line-following vibration suppressor in which the electrical termination impedance of the transducer is changed automatically in response to changes in the frequency of vibration applied to the transducer to provide the optimum electrical termination impedance which produces the highest effective mechanical impedance at said frequency. The transducer includes magnetic cores interconnected by a spring formed by cutting a relatively thin medial annulus in a relatively thick flat disk. A digital logic circuit uses a signal counter and NAND gates to determine the frequency of the vibration and to close the appropriate fast-acting relay in a parallel array of capacitor-relays to connect the optimum termination impedance to the transducer.

The present invention eliminates spurious resonances by including a shunting circuit in the transducer termination. The shunting circuit provides substantially no shunting at resonant frequency so that the performance at that frequency is not reduced. However, the shunting circuit provides substantial shunting at frequencies other than the resonant frequencies so that the effective Q of the apparatus is lowered at those frequencies and thus prevents or strongly moderates resonances at those frequencies.

The present invention further provides a negative-impedance electrical termination which produces a high mechanical impedance for the apparatus over a broad band of frequency.

An object of the invention is, therefore, to provide an improved method and apparatus for suppressing vibration.

Another object of the invention is to provide a method and apparatus for controlling electromechanical vibration suppressors so as to provide the proper electrical termination automatically in the case of a vibratory force having as a component a quasi-line in the spectrum which changes frequency slowly with time.

Yet another object of the invention is to provide a termination impedance for an electromechanical vibration transducer that is optimum at the frequency of suppression and yet prevents or strongly moderates spurious resonances.

Still another object of the invention is to provide a relatively simple negative impedance circuit for use as the electrical termination of a vibration transducer, said circuit providing optimum electrical termination over a broad range of frequencies.

Yet another object of the invention is to provide vibration suppression apparatus comprising electromechanical transducer means, termination means electrically connected to the transducer means for terminating the transducer means in a selected impedance, and control means connected to the transducer means and termination means for selecting the impedance of the termination means in response to the frequency of mechanical vibration communicated to the transducer means to provide said transducer means with a desired mechanical impedance at said frequency.

Still another object of the invention is to provide a transducer comprising a pair of cores of magnetic material, a coil on each core, spring means resiliently interconnecting said cores and comprising a relatively thick central disk, an outer mounting ring and a relatively thin medial portion extending between the central disk and the mounting ring, means for energizing said coils to produce a steady magnetic bias, an electrical circuit means connected to said coils and having an electrical impedance which effectively provides said transducer with a desired mechanical impedance.

Another object of the invention is to provide a method for forming spring means for resiliently interconnecting a pair of magnetic cores of a transducer comprising providing a flat, relatively thick piece of material, and cutting an annulus in a side of the material intermediate the center and outer edge of the material.

Still another object of the invention is to provide vibration suppression apparatus comprising electromechanical transducer means, a spring-mass combination mounted for parallel resonance and mechanically connected to said transducer means, an inductor and capacitor connected in series across the transducer means and tuned at the natural resonant frequency of the suppression apparatus, and shunting means for providing substantially no shunting across the inductor at the resonant frequency and substantial shunting across the inductor at other frequencies, thereby lowering the effective Q of the spring-mass combination at said other frequencies.

Still another object of the invention is to provide vibration suppression apparatus comprising electromechanical transducer means, a spring-mass combination mounted for parallel resonance and mechanically connected to the transducer means, circuit means connected across the transducer means for providing the suppression apparatus with a modified resonant frequency differing from the natural resonant frequency, and shunting means connected to the circuit means for providing substantially no shunting at the resonant frequency and substantial shunting at other frequencies, thereby lowering the effective Q of the spring-mass combination.

Another object of the invention is to provide vibration suppression apparatus comprising electro-mechanical transducer means and termination means electrically connected to the transducer means for terminating the transducer means in a negative impedance selected to provide said transducer means with a high mechanical impedance over a broad band of frequencies. said termination means comprising a series resistor, inductor and capacitor in the feedback loop of a parallel-type of negative impedance amplifier.

A further object of the invention is to provide a method for suppressing vibration comprising applying vibration to an electro-mechanical transducer, sensing the frequency of vibration, selecting a termination impedance capable of providing the transducer with a desired mechanical impedance at said frequency, and automatically connecting circuit means having said termination impedance to the transducer.

These and other and further objects and features of the invention are apparent in the disclosure which includes the above and below specification and claims and drawings.

DETAILED DESCRIPTION OF THE INVENTION

I. Line-Following Vibration Suppressor

Figure 5:
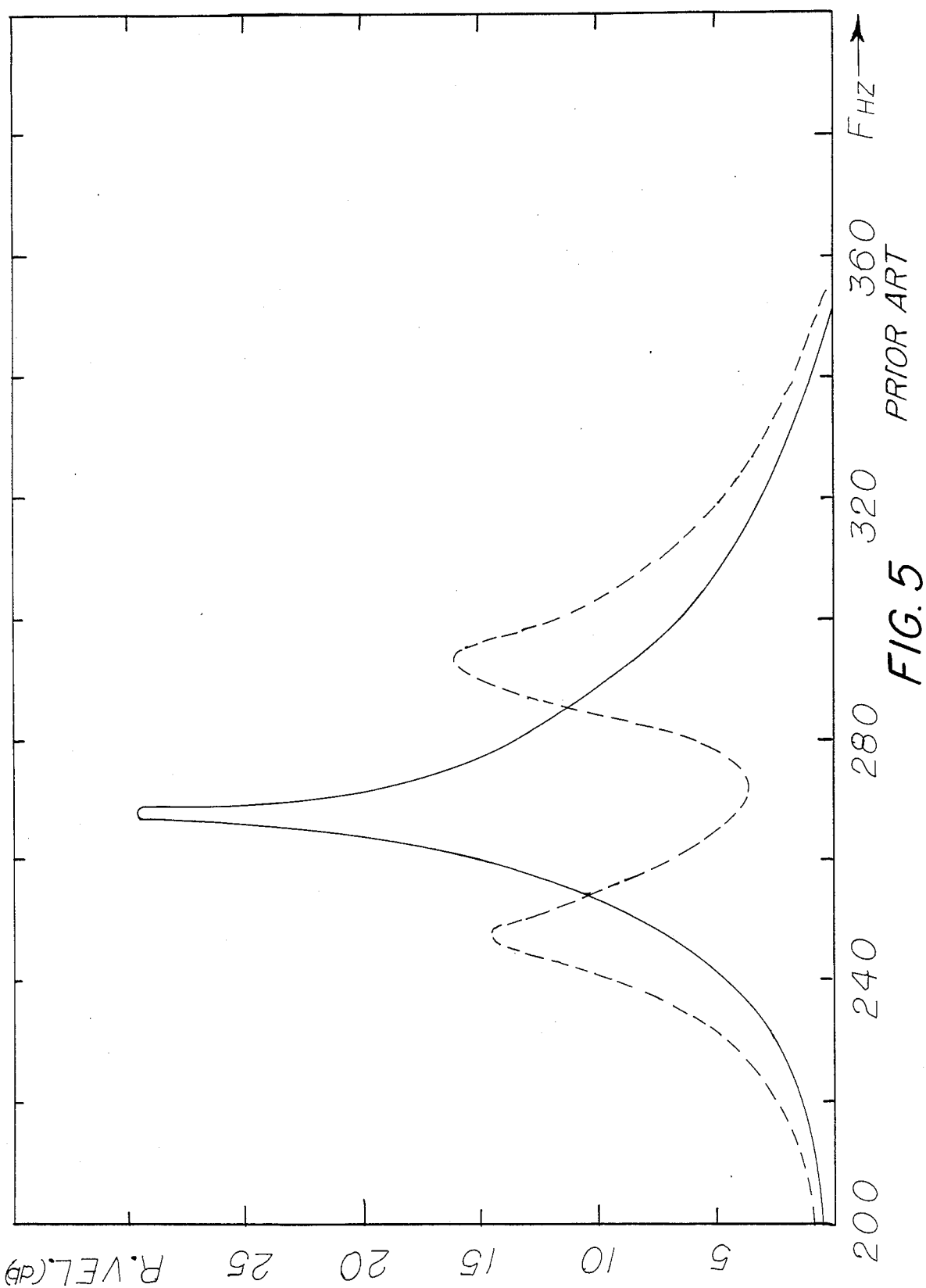
FIG. 5 is a graphical comparison of the vibration velocity of a non-suppressed vibration source versus the vibration velocity of a vibration source provided with a known vibration suppressor having a fixed external termination impedance.

There are important cases of vibration for which the principal component in the frequency spectrum is a line or, more importantly, a quasi-line whose frequency changes slowly with time. If the frequency was independent of time, a conventional dynamic absorber would work very well, provided the Q was high enough. But, if the frequency changes a relatively small amount, there will be a very noticeable drop in performance, as shown in FIG. 5.

Figure 3:
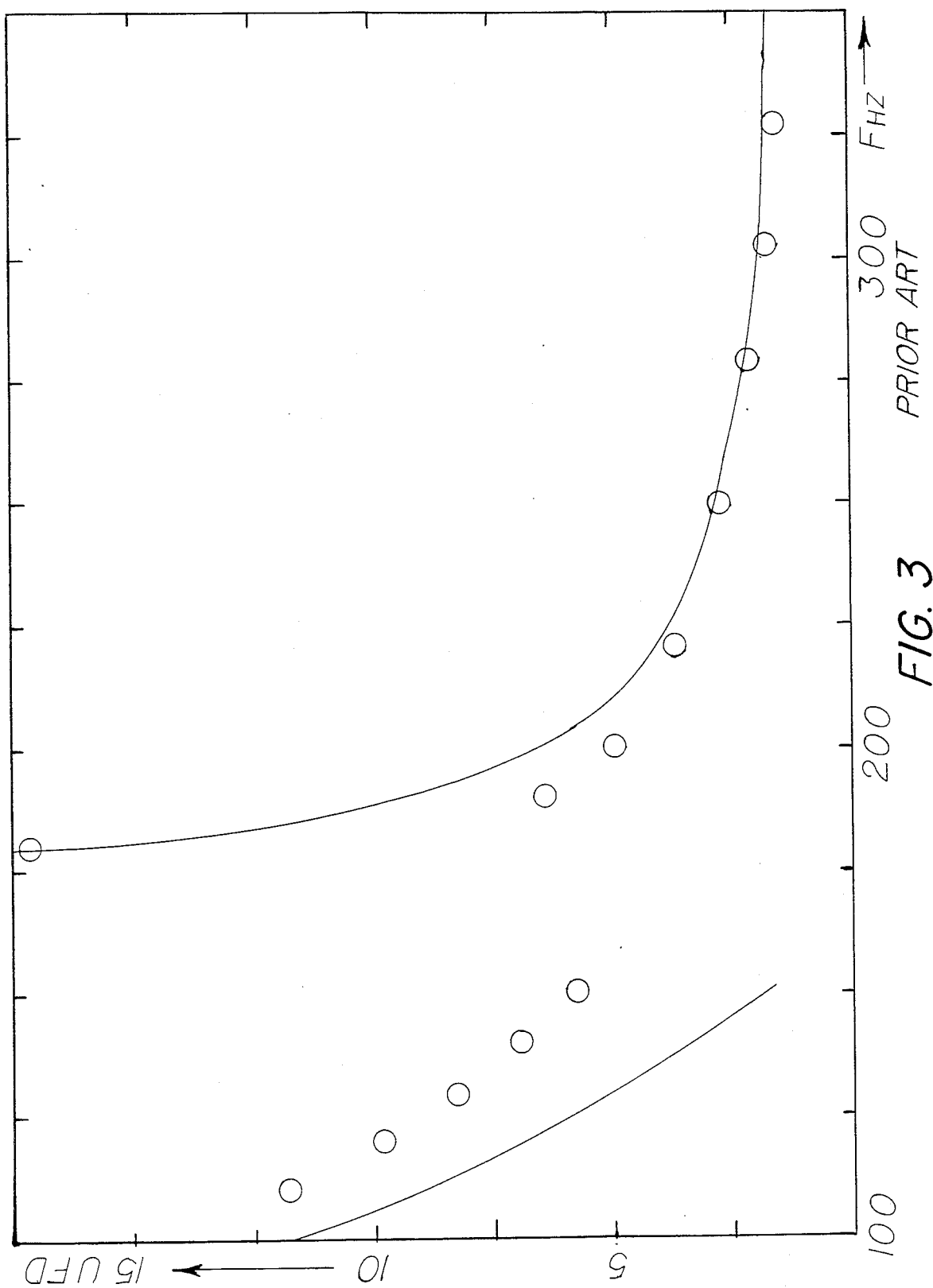
FIG. 3 is a graphical illustration showing the optimum external capacitances determined experimentally at a number of frequencies with a known vibration suppressor, and compared with a theoretical curve.
Figure 4:
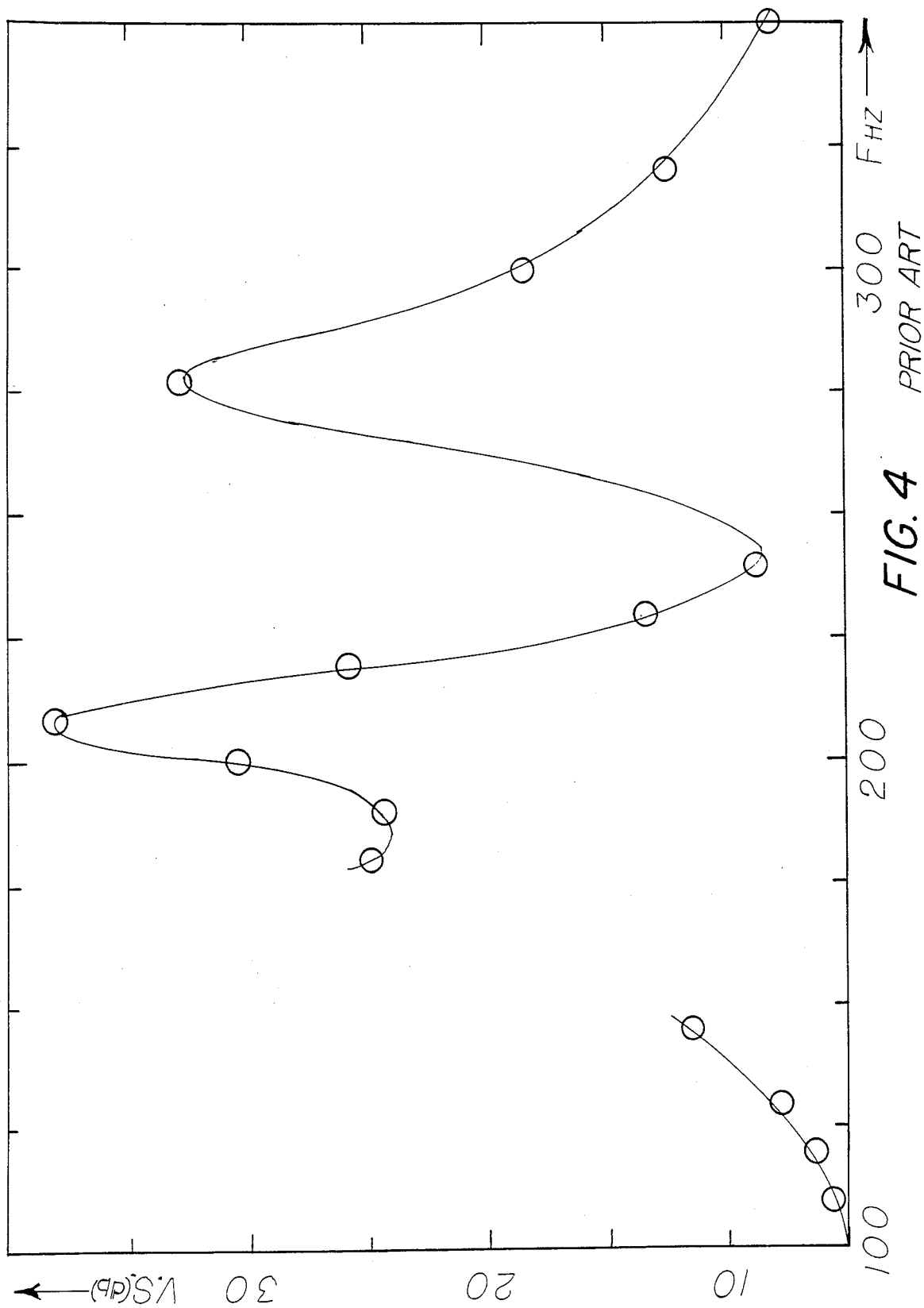
FIG. 4 is a graphical indication of the relative velocity of suppression as a function of frequency determined experimentally for the apparatus shown in FIG. 2, the external terminating capacitance at each frequency being given by FIG. 3.

It was shown in FIG. 4 that the vibration level could be reduced at a succession of frequencies by using the optimum external electrical termination for each frequency as predicted in FIG. 3.

The object of this invention is to do this automatically, i.e., to follow the "line frequency" as a function of time. It is also the object to do this not only for a very clean sinusoidal signal, but also for a signal embedded in random noise.

We start with a vibration suppressor having an unshifted parallel resonance frequency of the quasi-line. The spectrum of frequency on either side of $f_o$ is divided into a number of intervals $\Delta f_i$, $-N$, $-N+1$, ... $-1$, $1$, ... $N$, with $f_i$ at the center of the ith interval and where the quality factor $$Q_i = f_i / \Delta f_i$$

ought to be at least as large as $Q(f_i)$ of the parallel-resonant system. If there is no random noise, the frequency can be counted easily. With band-limited random noise present, the frequency of the line is estimated by counting the axis crossings (from the positive to the negative direction) for a fixed interval of time. The statistical analysis of S.O. Rice can be used to give the accuracy of the estimate as a function of the line level, noise level, band width and duration of the count. If the count falls in the interval $\Delta f_i$, the ith of a set of fast-acting relays closes and $Z'_{ei}$ is inserted as the external electrical termination of the transducer.

DESCRIPTION OF THE VIBRATION SUPPRESSOR

Figure 1:
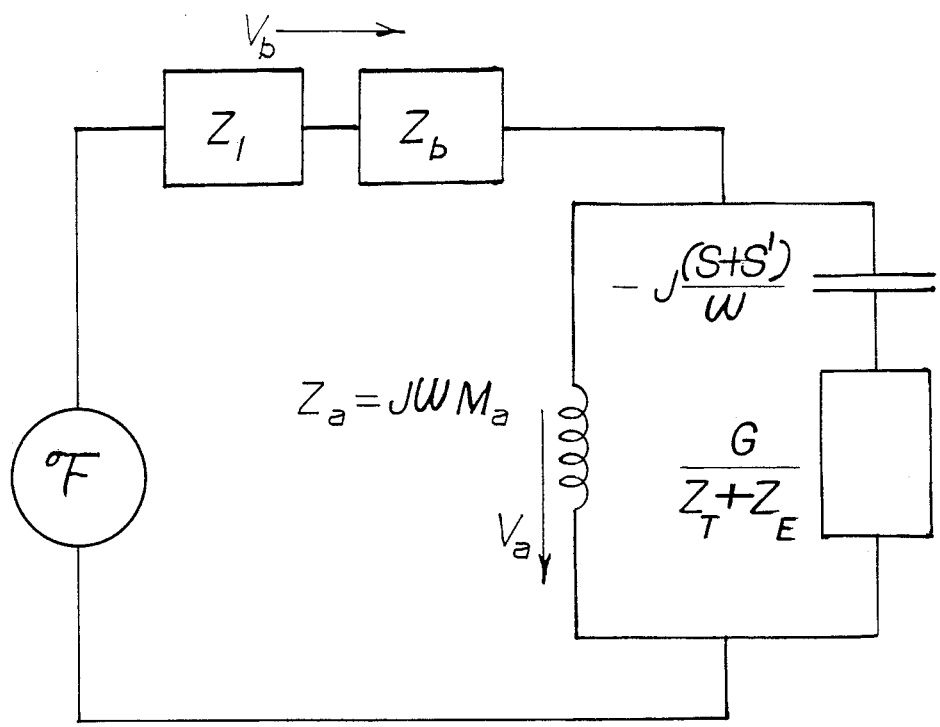
FIG. 1 is a circuit diagram showing the equivalent electrical circuit for a known electro-mechanical vibratory force suppressor.
Figure 2:
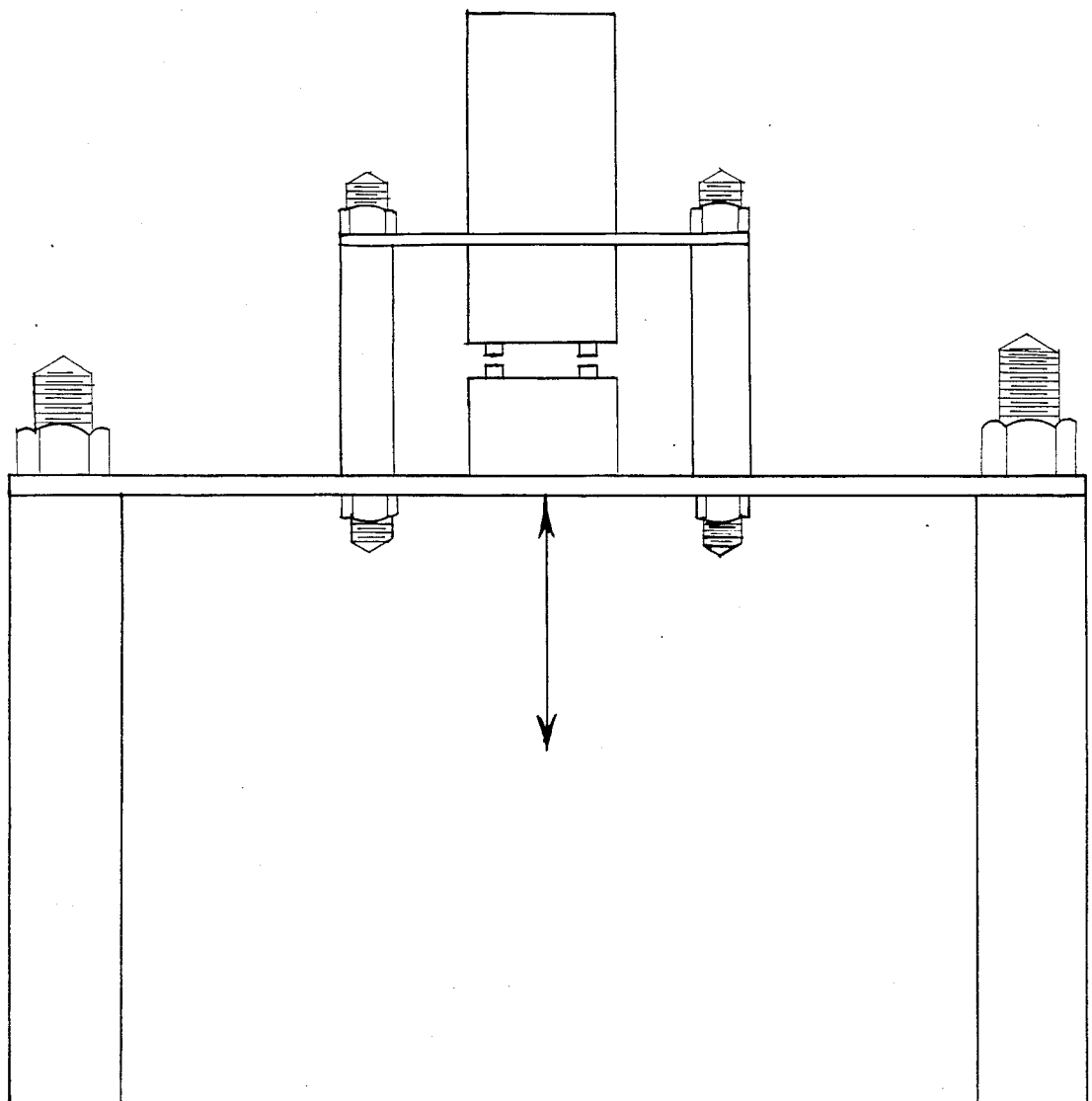
FIG. 2 is a plan view of a known vibration suppressor mounted on a simulated foundation and subjected to a concentrated vibrational force.

The vibration suppressor used in this invention was somewhat similar to that shown in FIG. 2 of the patent. The mechanical part is essentially a spring-mass combination mounted for parallel resonance. The transducer is of the variable reluctance type. There are associated electrical circuits to provide the d.c. magnetic bias, and connections to the logic circuit and to the electrical terminations.

Figure 7:
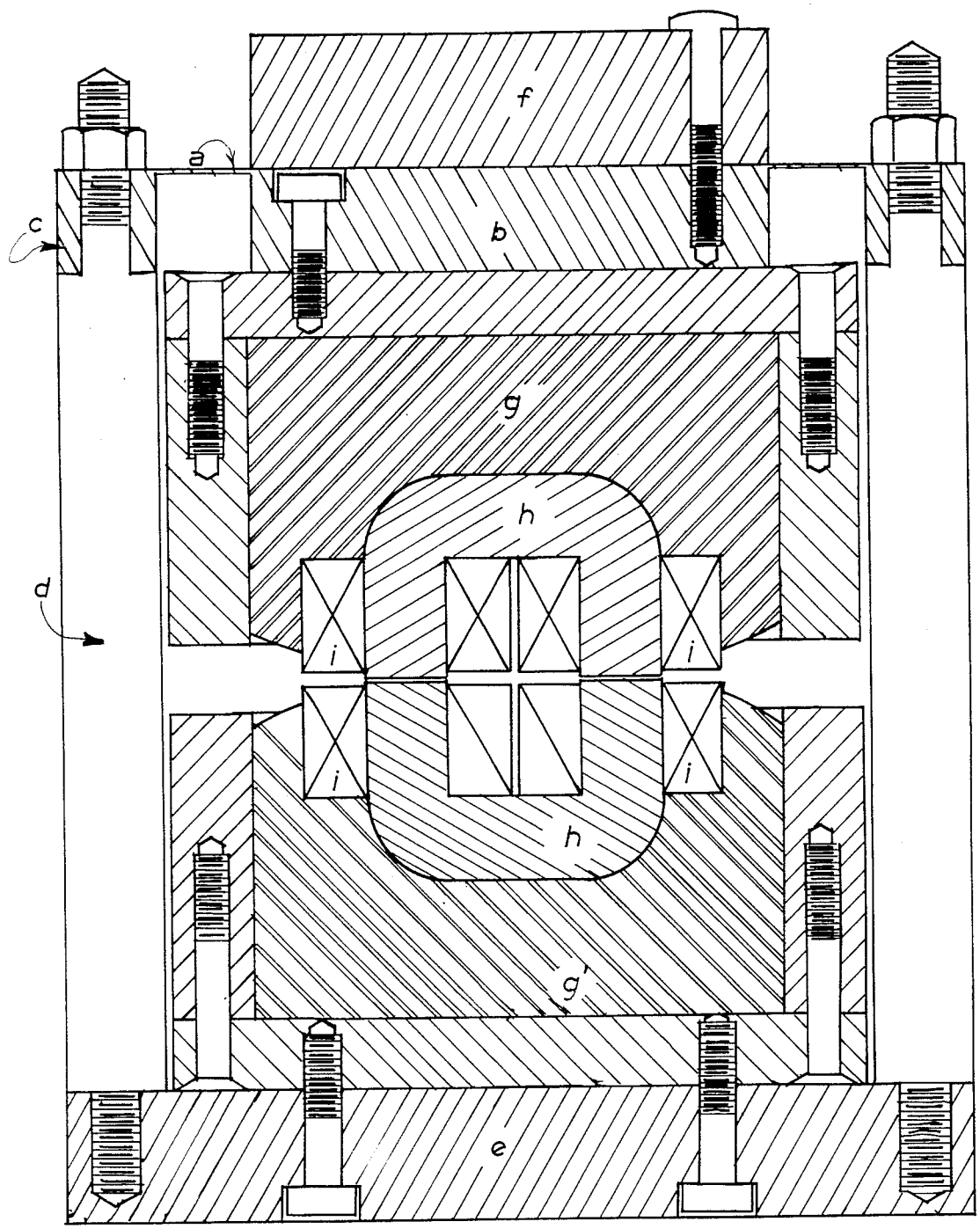
FIG. 7 is an elevational view, partly in section, of a mechanical parallel resonance and transducer combination embodying features of the present invention.

The spring used in the suppressor shown in the patent was a leaf spring. It was difficult to get the precise stiffness desired. It wasn't perfectly flat and thus introduced nonlinearities. It worked at the clamping points and thus reduced the mechanical Q. For this reason, the spring of the present invention was formed by cutting an annulus a into a flat, thick piece of high-alloy steel (FIG. 7). The annulus was integral with a central disc b and an outer mounting ring c. The outer ring was supported and held rigidly in place by six heavy studs d, the other ends of which were driven into the base plate e. An extra disk f was fastened to one side of the central disk b and one of the transducer core-cups g was fastened to the other side of the central disk b.

The heart of the transducer was a pair of magnetic cores h with coils i of wound copper with electromagnet-grade insulation. Each core was in the form of a "C". They were made of laminated, oriented-grain silicon steel. It was desirable that the incremental permeability of the core be high in spite of the large d.c. magnetic bias and that the hysteresis and eddy current losses be minimized. Four coils, one on each leg, were made to fill as much of the core "window" as possible. The two coils on each core were connected in series. Each core with its coils was potted with an epoxy-type potting compound in a micarta cup. The cores were oriented in the cups in such a way that the pole faces of the two cores were in juxtaposition. One cup was fastened to the central disk and the other was fastened to the base plate. The cups were shimmed so that the gaps between the pole faces closed to the appropriate value after the d.c. bias current was applied. The external coil leads from each cup were connected in series (although parallel operation is also proper).

Figure 8:
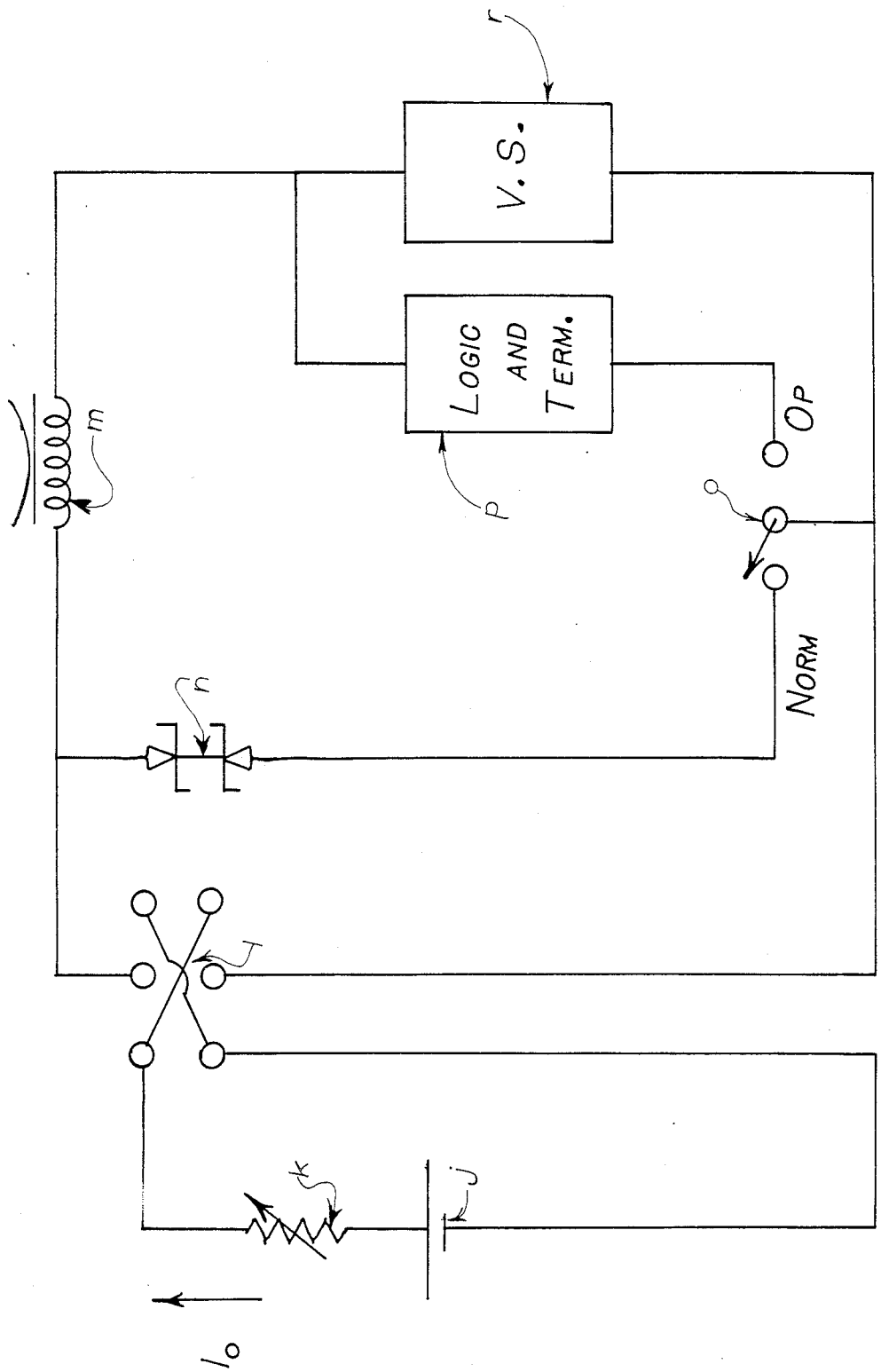
FIG. 8 is a circuit diagram of means for providing a d.c. bias to the vibration suppression apparatus of the present invention.

The d.c. bias current is provided by a battery j (FIG. 8), although an electronic high-impedance constant-current source can also be used. When the device is put into operation, it is imperative that the cores have no residual magnetization, i.e., be normalized. This is done by starting with a high d.c. current and simultaneously reducing and continually reversing the current. This is done with a rheostat k and an DPDT switch l. The d.c. current passes through a large swinging choke m; it prevents the d.c. source from shorting the transducer external connections. Because of its large inductance and the lesser blocked inductance $L_T$ of the transducer, there would be a very large voltage that would be generated when the current is interrupted. To prevent this, a pair (connected back-to-back) of high power Zener diodes n is used.

Once the cores are normalized, the d.c. current could be increased steadily from zero to the operating point. The selector switch o is then put on "Op" which connects the Logic and the transducer terminations p to the output leads of the transducer r.

Figure 9:
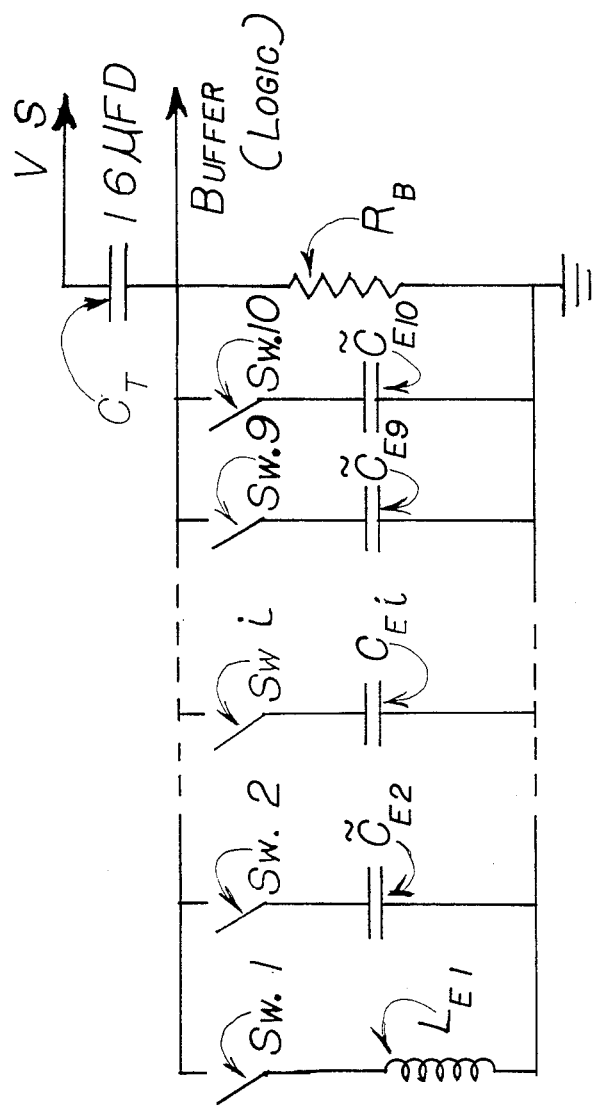
FIG. 9 is a circuit diagram of the transducer termination shown in FIG. 8.

FIG. 9 shows some details of the tranducer terminations. The termination of the transducer is made up of a 16 $\mu$fd capacitor $C_T$ in series with a particular capacitor, $\tilde{C}_{ei}$, $i = 2–10$. If "i" changes, the position of the latter is momentarily left open. To insure that a signal to the logic circuit is always present, a large bleeder resistor $R_B$ shunts $\tilde{C}_{ei}$. (The signal is taken from across the bleeder resistor.) It also prevents a slug of current when the "new" $\tilde{C}_{ei}$ is cut in since it allows the 16 $\mu$fd capacitor $C_T$ to remain charged to very nearly the d.c. voltage across the V.S.

The values of $\tilde{C}_{ei}$ were determined experimentally at the central frequency of each interval under the same conditions to be met in operation, e.g., the shielded cables to the bank of relays and to the logic circuits were in place. Those values are listed in the last column of Table I. The values are those indicated on the cover of the capacitors; the exact value of capacitance was not determined accurately. The case of $i = 1$ is special. $\tilde{C}_{ei}$ is not a capacitance; it is an inductance $L_{E1}$ of 0.035 H. It is a swing choke to keep the inductance nearly independent of the level of the signal through it.

The Logic System

Figure 10:
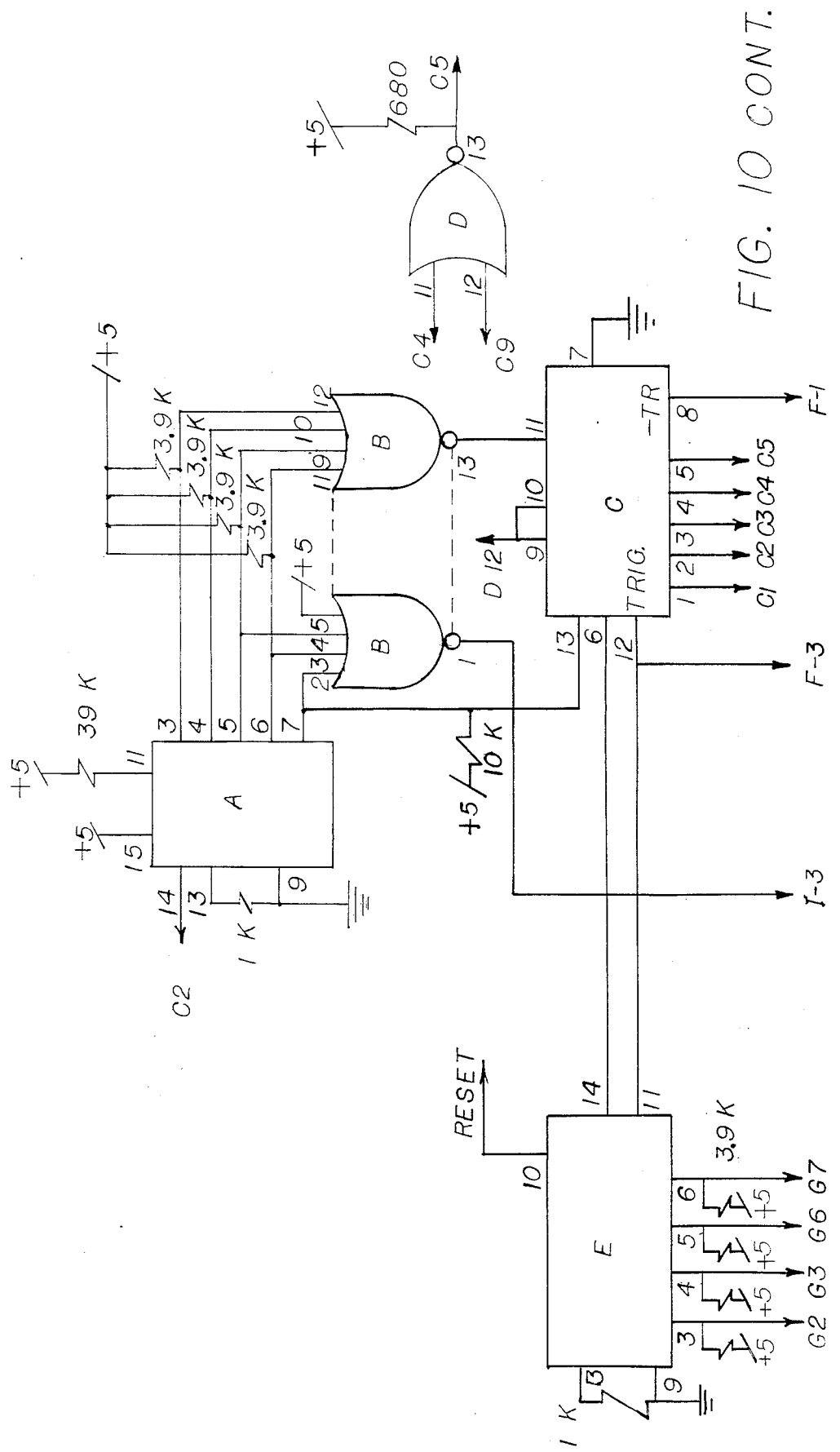
FIG. 10, 10A, 10B, and 10C, is a circuit diagram of the digital logic network shown in FIG. 8
Figures 10A, 10B, 10C:
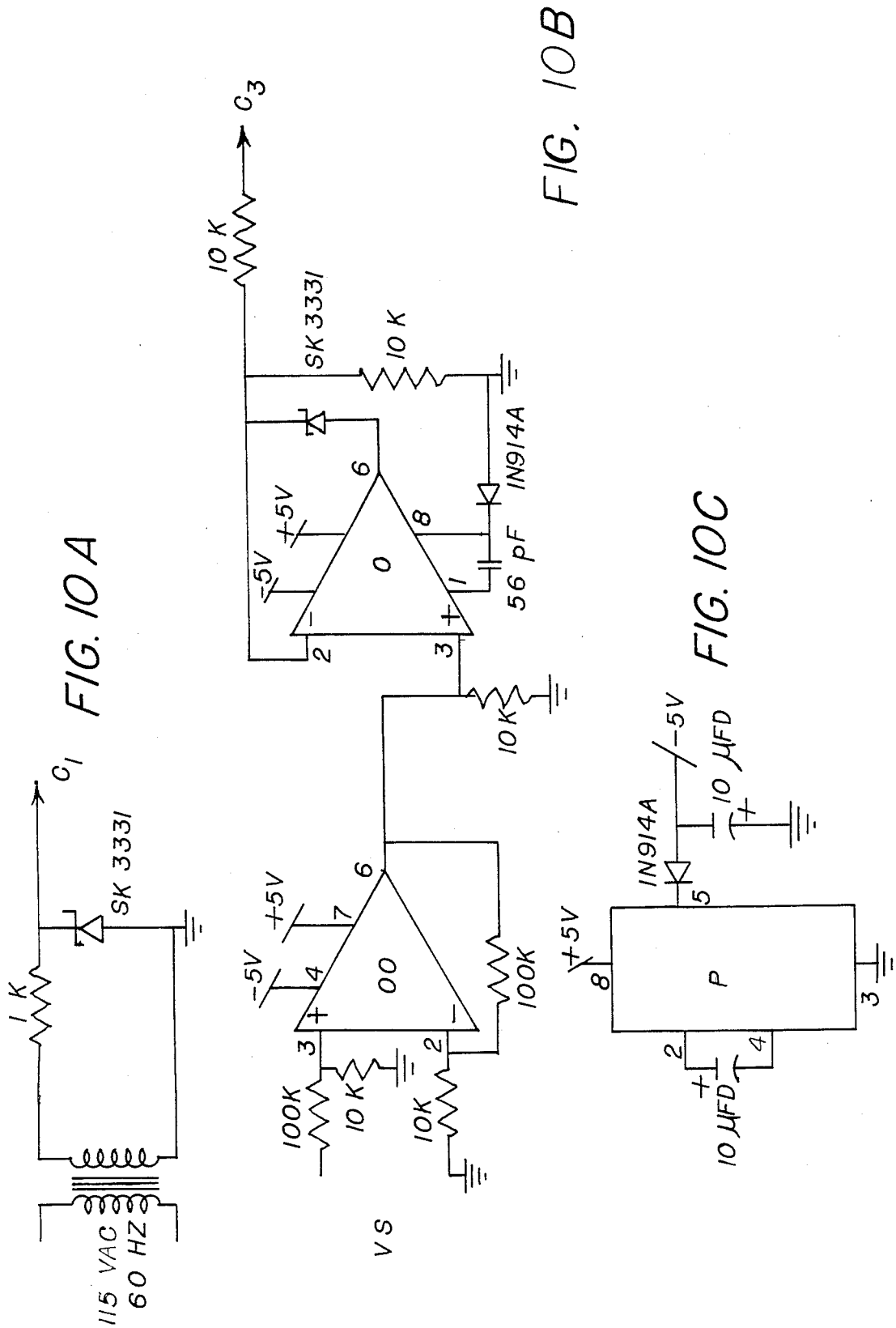

The process of treating a signal in order to insert impedance into the external terminals of the transducer is performed with the digital logic system using I.C.'s, as shown in FIG. 10. The signal is generated in the transducer as a result of the relative motion of the two core halves and is coupled from the transducer terminals through a 16 μfd capacitor to the logic input. (The logic input is also shunted by the ith external impedance $Z'_{ei}$.) This signal is conditioned in a buffer amplifier, BB, a precision Clipper 0, a Schmitt inverter C, and a NOR gate D (to prevent hang-up of a signal coinciding with limits of counting interval) and then to the signal counter E. The logic circuits used to analyze this signal are controlled by a clock. The clock signal (here a 60 hz signal from a power line, although a crystal clock could be used) is clipped in a diode circuit, conditioned in Schottky inverter C and counted in a BCD Counter A. The output of the counter is subjected to logic operations in two four-level NAND Gates B.

The counter is free-running. The seventh binary output is used to determine the duration of the basic counting cycles: 128 times 1/60 sec. This output is inverted and sharpened in a Schmitt Trigger Inverter C. The leading edge of the output pulse triggers the signal Counter E. Logic operation are performed by two 4-input NAND Gates B. One gate output occurs 1 sec after initiation of the cycle and is used to determine the count period. After a double inversion in C, it is used to trigger a Dual Mono MVB F to get an "enabling" pulse for a Latch G. This same output of gates B, after inversion in inverter C is compared with the signal output from inverter C in the NOR Gate D (see above). Another output of gates B, which occurs at 112 time 1/60 sec after the start of the cycle, is used, after an inversion in HEX Inverter I, to reset the signal counter E and, after another inversion in HEX Inverter I, to prevent the MVB F from sending out an "Enable" pulse during the latter (recovery) part of the counting cycle.

Once it is triggered, the signal counter E is set to run free, i.e., once a count of 256 is reached, it starts over again. For a signal frequency f lying between 256 hz and 296 hz, the count after 1 sec will appear as f−256. If the count number is taken from pins 3, 4, 5 and 6, the binary reading will be (f−256)/4. Of course, only integers are indicated and thus there is an increase in the count of 1 for each increase in four hz of the frequency. This is how the 4 hz width of the interval is obtained. Table 1 shows the reading of the binary counter for frequencies lying in each of the ten intervals to be covered.

TABLE 1

| i | Counter reading | Band | Center Band | $\tilde{C}_{ei}$ |
|---|---|---|---|---|
| 1 | 0000 | 256–260 hz | 258 hz | 0.035 Henries |
| 2 | 0001 | 260–264 hz | 262 hz | 5 μfd |
| 3 | 0010 | 264–268 hz | 266 hz | 3.224 μfd |
| 4 | 0011 | 268–272 hz | 270 hz | 2.32 μfd |
| 5 | 0100 | 272–276 hz | 274 hz | 1.948 μfd |
| 6 | 0101 | 276–280 hz | 278 hz | 1.616 μfd |
| 7 | 0110 | 280–284 hz | 282 hz | 1.494 μfd |
| 8 | 0111 | 284–288 hz | 286 hz | 1.371 μfd |
| 9 | 1000 | 288–292 hz | 290 hz | 1.318 μfd |
| 10 | 1001 | 292–296 hz | 294 hz | 1.224 μfd |

The output of the signal counter is continuously being fed to a LATCH G until E1 is reset which prepares it for the next cycle. This data is transferred to the Q output of the latch when it is "enabled" by a HIGH pulse from the MVB F. During the pulse ($\approx$ 800 μsec.), Q follows the data input. When the Enable signal goes LOW, the information that was present at the data input at the transition time is retained at the Q output until the Enable is again permitted to go HIGH.

The Latch G provides four BCD inputs to a One-of-Ten Decoder H which provides ten mutually exclusive outputs. Each channel has an inverter I and J, which can excite a Driver K and L. The excited Driver draws current through the ith relay - a fast-acting, no-bounce wetted-mercury reed relay. This introduces $C_{ei}$ into the terminating circuit (See FIG. 9). An alternative to the relay is an Analog Switch.

Test

The purpose of the test was two-fold: (i) to demonstrate that the line-follower actually worked and (ii) to determine the magnitude of the impedance of the suppressor as a function of frequency. Clearly, if the second aim is met, the first is also.

Ultimately, the final test of the device would be in practice. There, a comparison of vibration velocity with and without vibration suppression would indicate the advantage of the vibration suppressor for that location. But, if combination of the internal mechanical impedance of the noisy machine and of the base were small in magnitude, even a suppressor impedance of modest magnitude might suppress the vibration strikingly. Alternatively, the vibration of a very high impedance installation might not be altered much even though the magnitude of the suppressor impedance was quite high. To get a definitive picture of the suppressor's capability, it is desirable to ascertain the magnitude of the impedance of the vibration suppresssor as a function of frequency.

This is done by mounting the vibration suppressor on a ballistic disk. A vibrator, using the same type of cores and only a superficially different scheme of mounting, is also attached to the disk. All of the mass of the vibration suppressor and of the vibrator, except the spring-mass combination in each case, is added to the mass of the disk to determine the ballistic mass, M. The net impedance at the vibrator is Zv.s.+jwM. From the fundamental definition of impedance $$|f_{v.s.}| = |Z_{v.s.} + jwM| |vel_{v.s.}|,$$

where $|f_{v.s.}|$ is the magnitude of the force applied to the driver. The parameters of the driver are monitored and the velocity (as measured by an accelerometer mounted on the disk) magnitude $|vel_{vs}|$ is noted as a function of frequency. Then the d.c. current to the suppressor is removed, the cores pried apart and a sheet of smooth plastic forced between them. The bias current was again applied so that the cores clamped the plastic very tightly. The mass m of the spring-mass combination is thus added to M making a new ballistic mass M'=M+m, and the spring was fixed. This was also driven with a $|fM'|$ at many frequencies, the parameters of the driver were monitored, and the velocity magnitude $|vel_{M'}|$ was noted $$|f_{M'}| = |jwM'| |vel_{M'}|.$$

If the parameters of the driver are identical for the two cases at a given frequency, $$|z_{v.s.} + j\omega M| \, |vel_{v.s.}| = \omega M' |vel_{M'}|,$$

or $$|z_{v.s.} + j\omega M| = \frac{\omega M' |vel_{M'}|}{|vel_{v.s.}|}$$

At parallel resonance, $Z_{v.s.}$ is purely resistive and much larger than WM. Hence, $$|Z_{v.s.} + jwM| \doteq r_{v.s.}$$

at parallel resonance.

Figure 11:
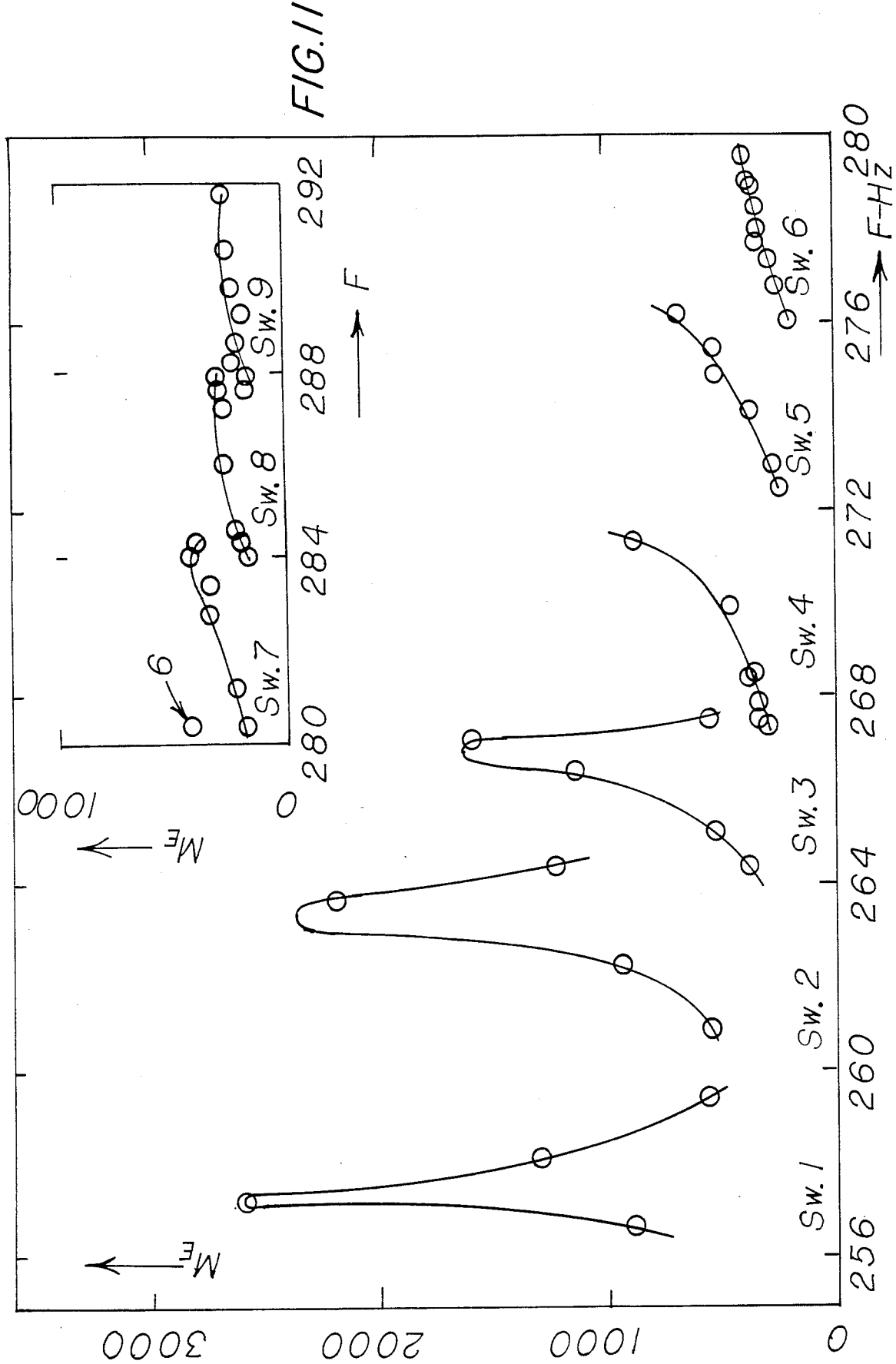
FIG. 11 is a graphical illustration of results obtained with the apparatus shown in FIGS. 8-10.
Figure 12:
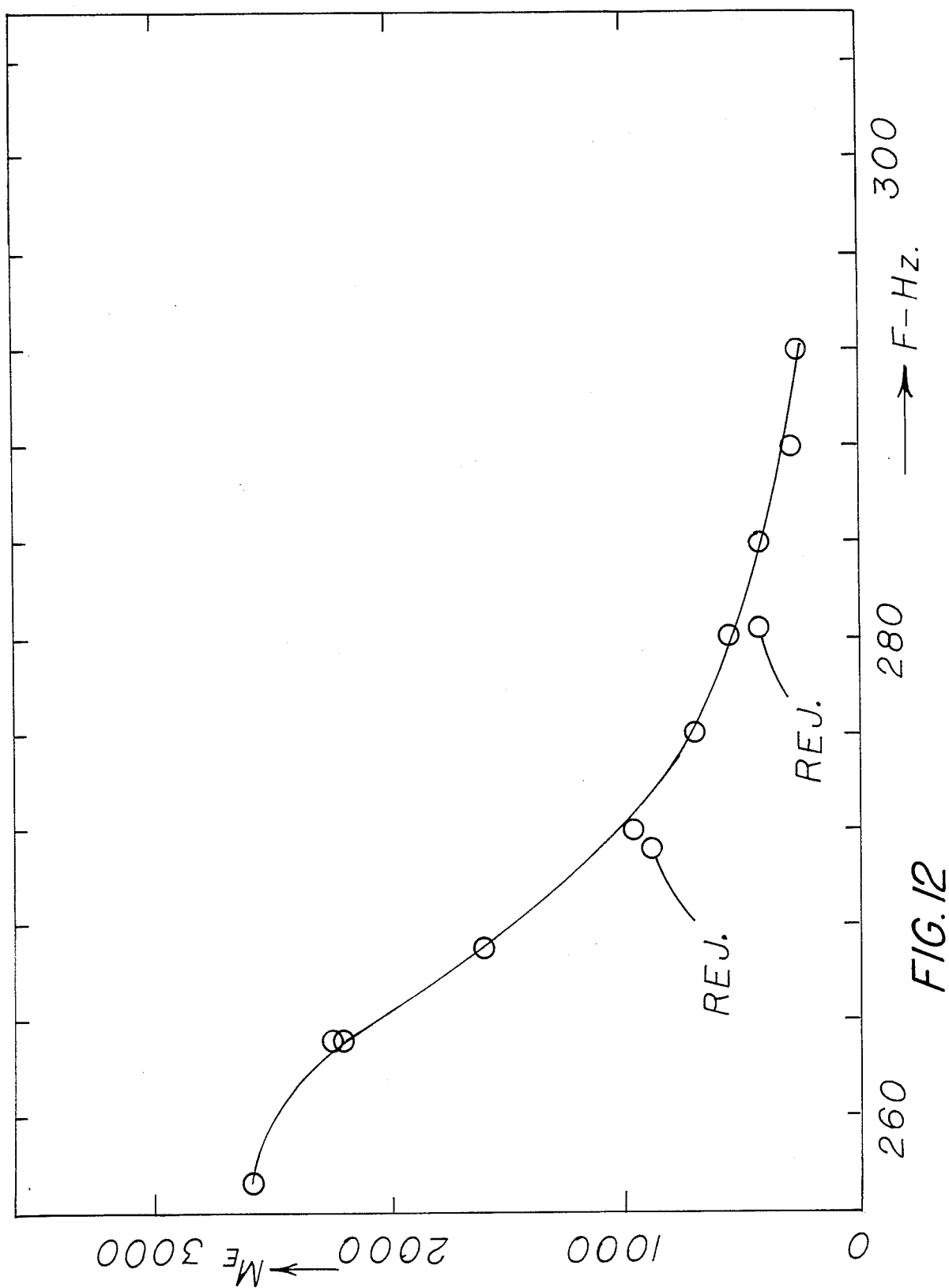
FIG. 12 is a graphic illustration of an equivalent mass curve obtained by drawing a smooth curve through the peaks shown in FIG. 11.

The result of one such dual experiment is given in FIG. 11. Here, $|Z_{v.s.}|$ *is given in terms of an effective mass, although it should be noted that $Z_{v.s.}$* is never a pure mass and, in fact, is purely resistive at a parallel resonance frequency. During the experiment, the relay that was closed at each frequency was determined; this is indicated in this figure. It can be seen that a peak of the effective mass occurs with each interval. The fact that the effective mass drops off sharply in the interval is due to a pessimistic estimate of the expected Q. The Q defined by the mid-frequency divided by this interval was approximately one-forth the actual Q for the first few intervals at least. As the parallel resonance frequency is displaced more and more, the peak becomes smaller and broader (lower Q). This results from the increase in electro-magnetic losses with the amount of displacement of the parallel resonant frequency. If narrower frequency intervals were used, the equivalent mass curve would approach that given in FIG. 12 which is made by drawing a smooth curve through the peaks of the previous curve.

II. Earless Dynamic Absorbers

The impedance of a spring-mass system in parallel resonance is purely resistive. As the frequency increases, the resistance drops (rapidly if the Q is high) and a stiffness reactance develops, reaches an extremum, and then (more slowly) diminishes in magnitude. As the frequency decreases below the parallel resonance frequency, the resistance also drops rapidly and a mass reactance develops, reaches a maximum, and then (more slowly) diminishes. If this reactance is equal and opposite to the sum of the internal reactance of the machine and the reactance of the foundation ($Z_i + Z_b$), the net reactance is zero and there is a spurious mechanical series resonance. The resulting vibratory velocity may exceed the vibratory velocity of the machine and of the foundation without the suppressor, as shown in FIG. 5, where the plot of velocity without suppression sticks up above the velocity with suppression on both sides of the tuned frequency. The loops are sometimes called "ears", although they may not be symmetrical or may not both be present.

An object of this invention is to prevent the spurious resonances, or to moderate the velocity there. The standard practice is to add sufficient damping to the dynamic absorber so that the damped spring-mass combination has enough resistance that the mechanical Q of the spurious series resistance is low and the size of the "ears" are significantly reduced. Unfortunately, this reduces the performance at the parallel resonance frequency.

Consider an electrical impedance shunting Zei in such a way that the shunting action is insignificant at the ith parallel resonant frequency $f_{oi}$, but for frequencies sufficiently different from $f_{oi}$, the shunting effect on $Z_{ei}$ would be quite noticeable and quite resistive In the latter case, $Z_v$ become fairly resistive and the parallel circuit of the vibration suppressor would likewise be quite resistive. Any spurious series resonance (probably at a slightly different frequency) would then have a low Q.

Consider a vibration suppressor used as a dynamic absorber. (Below, a more general case will be given.) If the terminating electrical impedance is zero, the device behaves simply like a mechanical parallel resonance circuit. A series capacitor $C_{ET}$—inductor $L_{ET}$ combination terminates the transducer with a zero impedance if the combination is series resonant at $f_o$. The impedance is small for frequencies near $f_o$, especially if the inductance is small. The inductor should be a "swinging choke" or else have a powdered iron core in order that the inductance be relatively independent of the excitation. Now consider an impedance $Z_{os}$ shunting the inductor $L_{ET}$. The shunting effect of Z should be insignificant at $f_o$, but, for frequencies sufficiently different from $f_o$, the shunting effect should be quite noticeable and quite resistive. In the latter case, the virtual mechanical impedance resulting from the action of the transducer would likewise be quite resistive. In turn, the impedance of the parallel-resonance combination will also be quite resistive. At some $f_s$ not too different from $f_o$, the reactive part of this combination might be equal and opposite to the reactance of the base plus the machine resulting in a series resonance. The vibration velocity then is high unless the resistive part of the combination is significant.

Figure 13:
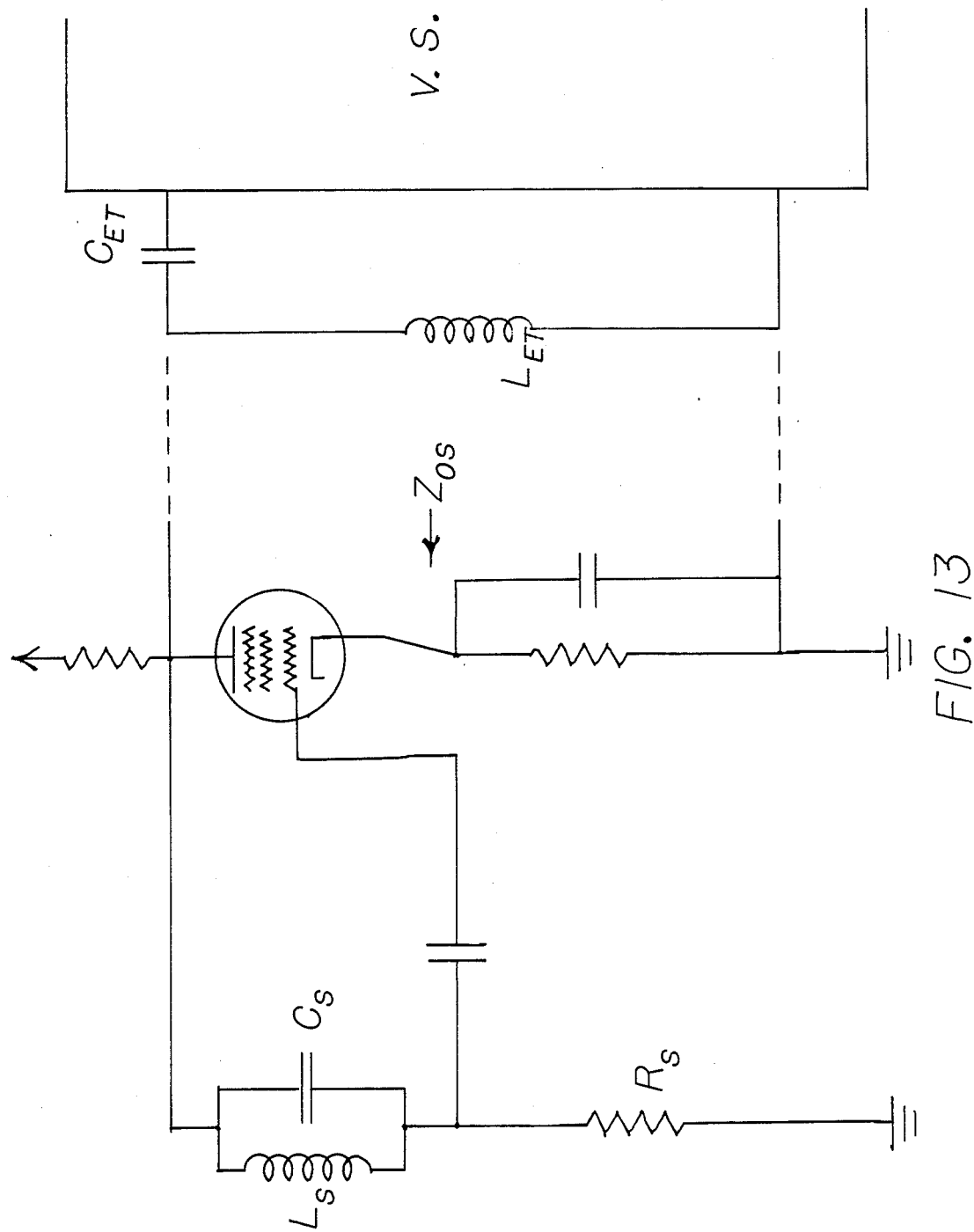
FIG. 13 is a circuit diagram of a transducer termination network including a variable shunt.
Figure 14:
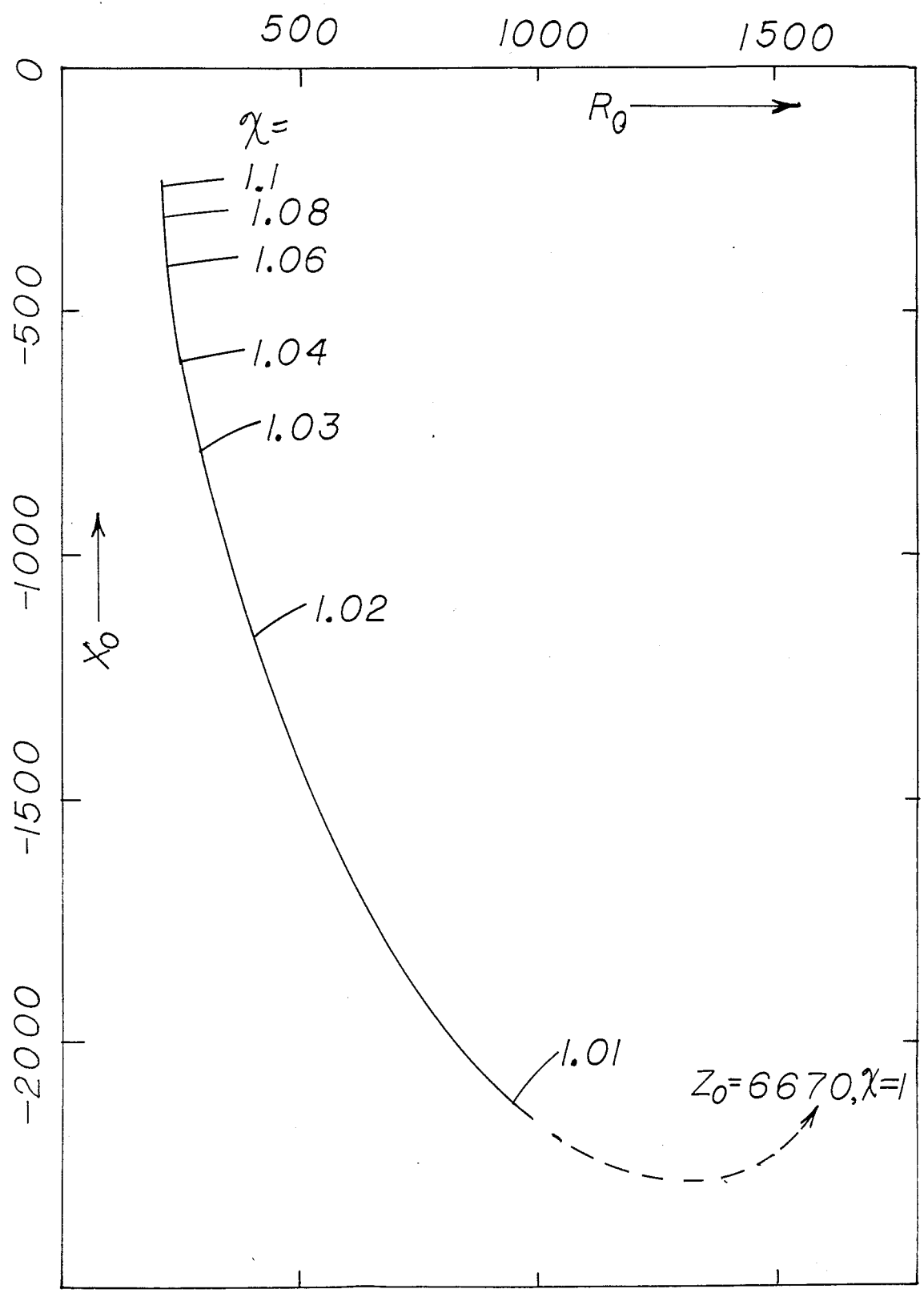
FIG. 14 is a graphical illustration of the impedance of the variable shunt shown in FIG. 13.
Figure 15:
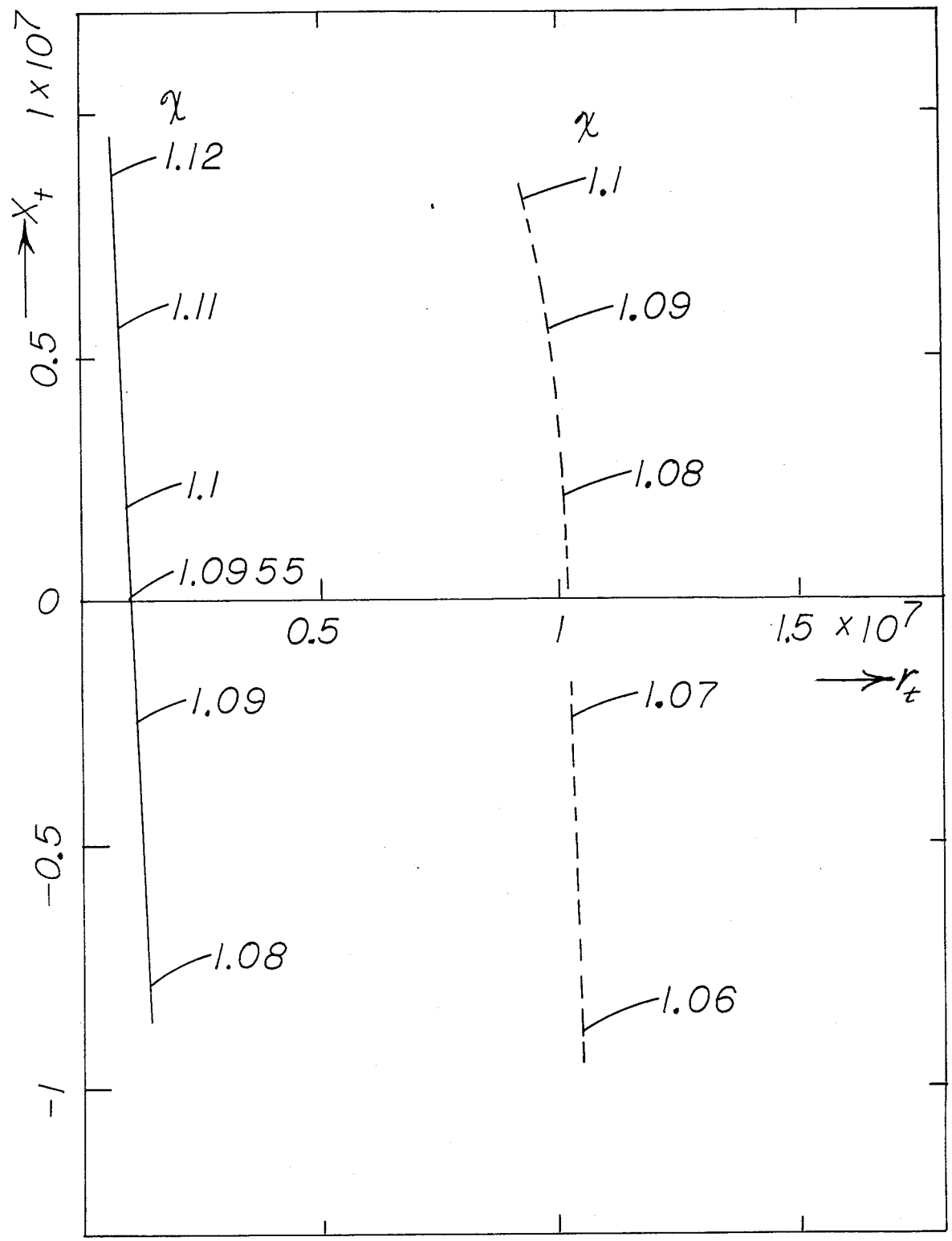
FIG. 15 is a graphical comparison of the total mechanical impedance of the system shown in FIG. 13 with the transducer bias cut off, and with the transducer activated and terminated as shown in FIG. 13.

One way of providing the different degrees of shunting by $Z_{os}$ is by tailoring the output impedance of an amplifier by introducing an appropriate filter in the negative feedback circuit. The output impedance $Z_{os}$ is given by $$Z_{os} = \frac{1}{\frac{1}{r_p} + Tg_m}.$$

where rp is the plate resistance, gm is the mutual transconductance and T is the transmission of the filter to the grid in the negative feedback circuit. In the specific example, (FIG. 13), the feedback filter is a parallel combination of an inductor $L_s$ and a capacitor $C_s$ in series with a resistor $R_s$. Provided that the parallel resonance frequency is also $f_o$, $R_s$ is comparable to $W_o L_s$, and $W_o L_s / r_s$ is large, where $W_o L_s / r_s$ is the Q of the inductor. Then $$T = \frac{R_s}{R_s + \frac{r_s + jr_s X\left[-QX^2 + Q - \frac{1}{Q}\right]}{X^2\left[\frac{1}{Q^2} + \left(X - \frac{1}{X}\right)^2\right]}},$$

where $X = f/f_o$, a non-dimensional frequency. For $Q=140$, $R=38{,}000\Omega$, $r=64.7\Omega$, $gm=5\times 10^{-3}$ mhos and where the 1/rp term can be ignored, $Z_{os}$ is given by FIG. 14. Computations have been made of the efficacy of this shunting of $L_{ET}$ for transducer parameters similar to those obtained in the test of Section I. The zero impedance termination at $f_o = 256$ hz is obtained with a capacitor, $C_{ET}$ of 2.76 $\mu$fd in series with an inductor $L_{ET}$ of 0.14 henries. The mass m is taken as 10 lbs. and (s+s') is $9.46 \times 10^9$ c g.s. units. The electromechanical coupling constant G is taken $1.271 \times 10^9$ c.g.s. units, the blocked inductance is taken 0.554 henries. The foundation is taken as a mass M of 50 lbs. The Q of the (s,m) combination is taken as 260. With the transducer bias cut off, the total mechanical impedance of $Z_t$ of M with the parallel resonance combination of s and m (acting as a high-Q dynamic absorber) is given by the solid curve of FIG. 15. With the transducer activated and terminated with $C_{ET}$ in series with $L_{ET}$ and with $L_{ET}$ shunted by $Z_{os}$, the total mechanical impedance $Z_t$ is given by the dashed curve in FIG. 15. For both curves, the parametric values $\chi$ along the curves are indicated. Note that, in the former case, $|Z_t|$ is a minimum at $f_s \cong 1.0955$, so that, with a constant exciting force, the vibration velocity of M is increased at the series resonance by a factor of 40; in the later case, $f_s \approx 1.077$ and the vibration velocity of M is increased by a factor of only 3.86. Thus, the vibration velocity at the spurious resonance is reduced by a factor of 10.4. In the latter case, the shunting effect of $Z_{os}$ is not completely neglible at $f_o$; the magnitude of the impedance generated is 30% less than it would have been had there been no shunting effect. The vibration velocity is increased even somewhat more because of the added attenuation provided by the electromagnetic losses in the transducer at $X \neq 1$.

If the shunting impedance is $Z_e(f_{oi})$, $f_{oi} \neq f_o$, the $Z_e$ is large enough so that $Z_{os}$ can shunt it in the manner above. Here, $Z_{os}$ should not provide noticeable shunting at the new antiresonant frequency $f_{oi}$, and strongly resistive shunting above and below that frequency.

III. A Broadband Termination for the Vibration Suppressor

Figure 6:
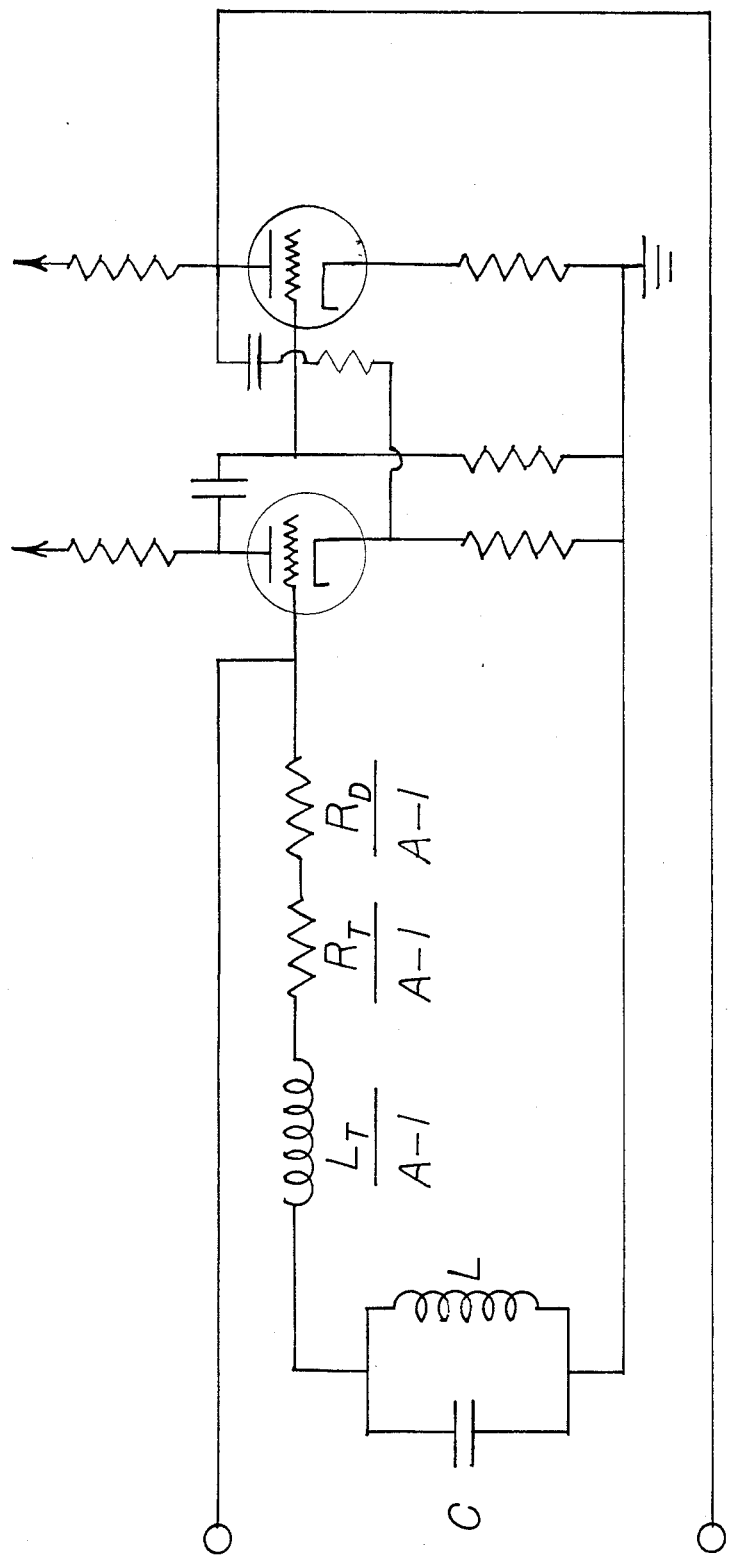
FIG. 6 is circuit diagram of a positive feedback circuit for obtaining broad-band electrical termination.

FIG. 6 gives a means of providing the optimum electrical termination for a vibration suppression effective over a broad band of frequencies. It was shown experimentally (See Sec. I) and theoretically that the electromagnetic loss increases with $|f-f_o|$. This limits the width of frequency band over which the optimum termination is effective. An object of this invention is to provide an electrical termination over the effective bandwidth of the V.S. Its advantage is that it is simple and more stable.

Using the Analysis contained in the above mentioned patent, one can show that the exact formula for $Z_e$ can be replaced by an approximate one:

$$Z_e \doteq j\alpha(1-X), \ |X-1| << 1, X = \omega/\omega_o,$$

where $$\alpha = \omega_o L_T \left( \frac{-2s}{s'} \right), X = \omega/\omega_o.$$

Figure 16:
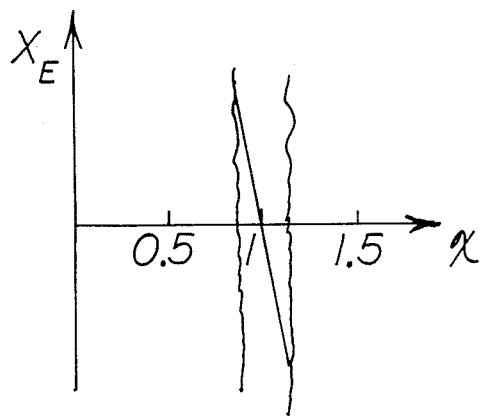
FIG. 16 shows a graphical approximation for a termination impedance.

That is shown in FIG. 16.

Figure 17:
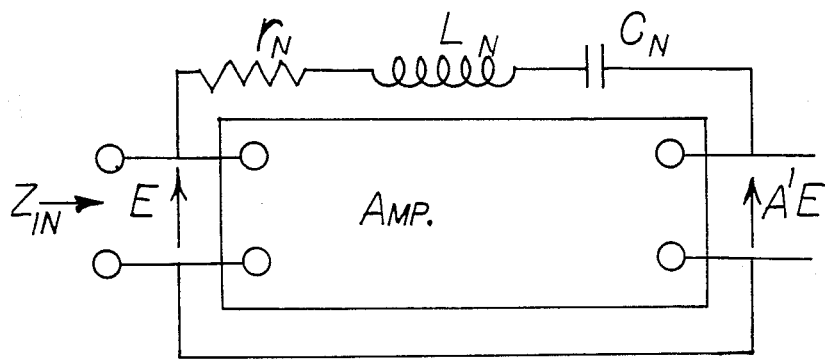
FIG. 17 shows a negative impedance circuit used in the present invention.

Consider the negative inductance or negative capacitance circuit shown in FIG. 17. If A' is the complex gain and $W_o L_N = 1/W_o C_N$, then the input impedance $Z_{in}$ is given by $$Z_{in} = \frac{-r_N}{A'-1} + j \frac{2\omega_o L_N (1-X)}{A'-1}.$$

If A' is positive and $> 1$, this represents a negative resistance in series with an imaginary term $$jL'(1-X), \alpha' = \frac{2\omega_o L_N}{A'-1}.$$

Setting $\alpha = \alpha'$ gives the condition $$\frac{L_N}{A'-1} = L_T \left( \frac{-s}{s'} \right).$$

Figure 18:
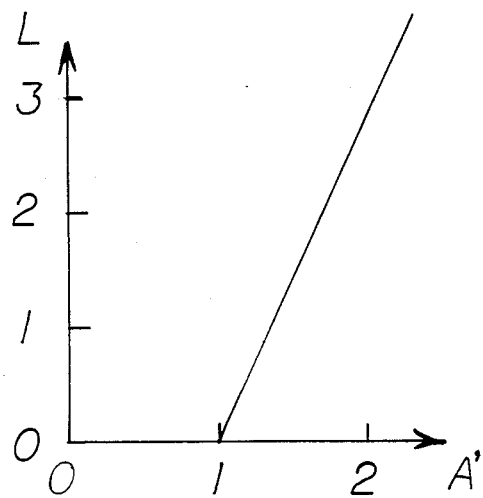
FIG. 18 is a graphical representation of a parameter of the circuit shown in FIG. 17.

Using the transducer parameters of the previous section, i.e., $L_T = 0.554$ henries, $s = 1.176 \times 10^{10}$ dynes/cm, $s' = 2.296 \times 10^9$ dynes/cm, the last equation is plotted in FIG. 18.

While the invention has been described with reference to specific embodiments, the exact nature and scope of the invention is defined in the following claims.

I claim:
1. Vibration suppression apparatus comprising electro-mechanical transducer means,
    termination means electrically connected to the transducer means for terminating the transducer means in a selected impedance, and
    control means connected to the transducer means and termination means for automatically selecting the impedance of the termination means in response to the frequency of mechanical vibration communicated to the transducer means to provide said transducer means with a desired mechanical impedance at said frequency.
2. The apparatus of claim 1 further comprising a spring-mass combination mounted for parallel resonance and mechanically connected to said transducer means.
3. The apparatus of claim 1 wherein the desired mechanical impedance is a high mechanical impedance.
4. The apparatus of claim 1 wherein the termination means comprises a parallel array of capacitor-relays.
5. The apparatus of claim 4 wherein the relays are operated by the control means.
6. The apparatus of claim 4 wherein the relays comprise fast-acting, no-bounce, wetted mercury reed relays.
7. The apparatus of claim 4 wherein the capacitance of each capacitor-relay differs from the capacitance of the other capacitor-relays.
8. The apparatus of claim 4 wherein a series capacitor is connected between the parallel array and the transducer means.
9. The apparatus of claim 4 wherein the capacitor-relays are shunted by a resistor.
10. The apparatus of claim 4 further comprising an inductor-relay in the parallel array.
11. The apparatus of claim 1 wherein the termination means comprises an inductor and capacitor connects across the transducer means and tuned at the natural resonant frequency of the suppression apparatus, and
    shunting means for providing substantially no shunting across the inductor at the resonant frequency and substantial shunting across the inductor at other frequencies, thereby lowering the effective Q of the spring-mass combination at said other frequencies.
12. The apparatus of claim 11 wherein the shunting means comprises an amplifier having a filter means in a negative feedback circuit.

13. The apparatus of claims 12 wherein the filter means comprises a parallel combination of an inductor and capacitor in series with a resistor.

14. The apparatus of claim 1 wherein the termination means comprise
  circuit means connected across the transducer means for providing the suppression apparatus with a modified resonant frequency differing from the natural resonant frequency, and
  shunting means connected to the circuit means for providing substantially no shunting at the modified resonant frequency and substantial shunting at other frequencies, thereby lowering the effective Q of the spring-mass combination.

15. The apparatus of claim 1 wherein the transducer means comprises a variable reluctance transducer.

16. The apparatus of claim 1 wherein the transducer means comprises a pair of cores of magnetic material, a coil on each core, spring means resiliently interconnecting said cores, and means for energizing said coils to produce a steady magnetic bias.

17. The apparatus of claim 16 wherein the spring means comprises a relatively thick central disc, an outer mounting ring, and a relatively thin medial portion extending between the central disc and the mounting ring.

18. The apparatus of claim 17 wherein the medial portion is formed integrally with the central disc and mounted ring.

19. The apparatus of claim 17 wherein the medial portion is annular.

20. The apparatus of claim 16 wherein the means for energizing the coils is selected from the group consisting of a d.c. voltage source and a high impedance current source.

21. The apparatus of claim 1 wherein the control means comprises a digital logic means.

22. The apparatus of claim 21 wherein the digital logic means comprises a signal counter.

23. The apparatus of claim 21 wherein the digital logic means comprises NAND gates.

24. The apparatus of claim 1 wherein the control means comprises a microprocessor.

25. The apparatus of claim 1 wherein the control means comprises a phase-lock amplifier.

26. A transducer comprising a pair of cores of magnetic material, a coil on each core, spring means resiliently interconnecting said cores and comprising a relatively thick central disc, an outer mounting ring and a relatively thin medial portion extending between the central disc and mounting ring, means for energizing said coils to produce a steady magnetic bias, and electrical circuit means connected to said coils and having an electrical impedance which varies automatically to provide said transducer with a desired mechanical impedance.

27. Vibration suppression apparatus comprising
  electro-mechanical transducer means,
  a spring-mass combination mounted for parallel resonance and mechanically connected to said transducer means,
  an inductor and capacitor connected in series across the transducer means and tuned at the natural resonant frequency of the suppression apparatus, and
  shunting means for automatically substantially no shunting across the inductor at the resonant frequency and substantial shunting across the inductor at other frequencies, thereby lowering the effective Q of the spring-mass combination at said other frequencies.

28. The apparatus of claim 27 wherein the shunting means comprises an amplifier having a filter means in a negative feedback circuit.

29. The apparatus of claim 28 wherein the filter means comprises a parallel combination of an inductor and capacitor in series with a resistor.

30. Vibration suppression apparatus comprising
  electro-mechanical transducer means,
  a spring-mass combination mounted for parallel resonance and mechanically connected to the transducer means,
  circuit means connected across the transducer means for providing the suppression apparatus with a modified resonant frequency differing from the natural resonant frequency, and
  shunting means connected to the circuit means for automatically providing substantially no shunting at the modified resonant frequency and substantial shunting at other frequencies, thereby lowering the effective Q of the spring-mass combination.

31. Vibration suppression apparatus comprising
  electro-mechanical transducer means, and
  termination means electrically connected to the transducer means for terminating the transducer means in a negative impedance selected to provide said transducer means with a high mechanical impedance over a broad range of frequencies, said termination means comprising a series resistor, inductor and capacitor in the feedback loop of a parallel-type of negative-impedance amplifier.

32. A method for suppressing vibration comprising
  applying vibration to an electro-mechanical transducer,
  sensing the frequency of vibration,
  selecting a termination impedance capable of providing the transducer with a desired mechanical impedance at said frequency, and
  automatically connecting circuit means having said termination impedance to the transducer.

33. The method of claim 32 wherein the desired mechanical impedance is a high mechanical impedance.

34. The method of claim 32 the termination impedance is the optimum impedance which produces the highest mechanical impedance at said frequency.

35. The method of claim 32 wherein the transducer converts said vibration into an electrical signal and the sensing step comprises counting the axis crossings of said signal over a predetermined time interval, 36. The method of claim 32 further comprising automatically shunting the circuit means at frequencies other than the resonant frequency thereby lowering the effective Q at said other frequencies and eliminating spurious resonance.

37. The method of claim 32 further comprising automatically shunting the circuit means at resonant frequency thereby eliminating spurious resonances.

* * * * *

UNITED STATES PATENT OFFICE
CERTIFICATE OF CORRECTION

Patent No. 4,816,725                    Dated March 28, 1989

Inventor(s) Albert A. Hudimac

It is certified that error appears in the above-identified patent and that said Letters Patent is hereby corrected as shown below:

Claim 11, line 2, change "connects" to --connected in series--.

Claim 27, line 9, after "automatically" insert --providing--.

Claim 34, line 1, after "32" insert --wherein--.

Signed and Sealed this

Eighteenth Day of July, 1989

Attest:

DONALD J. QUIGG

Attesting Officer        Commissioner of Patents and Trademarks